United States Patent [19]

Stothart

[11] 3,721,806

[45] March 20, 1973

[54] DIGITAL ENCODER FOR MECHANICAL COUNTERS

[75] Inventor: David C. Stothart, Cheswick, Pa.

[73] Assignee: Gulf Reserarch & Development Company, Pittsburgh, Pa.

[22] Filed: Nov. 26, 1971

[21] Appl. No.: 202,446

[52] U.S. Cl...........235/61 PD, 235/91 R, 235/92 EA, 235/94 R, 235/117 R, 340/347 P

[51] Int. Cl.........G06m 1/00, G06c 27/00, G06f 7/38

[58] Field of Search..235/61 PD, 92 EA, 91 R, 94 R, 235/117 R; 340/347 P

[56] References Cited

UNITED STATES PATENTS

| | | | |
|---|---|---|---|
| 3,387,267 | 6/1968 | Little | 340/347 P |
| 3,497,138 | 2/1970 | Fisher | 235/61 PD |
| 2,127,733 | 8/1938 | Herbst | 235/61 PD X |
| 2,302,769 | 11/1942 | Haselton | 235/61 PD X |
| 2,774,063 | 12/1956 | Grinstead et al. | 235/92 EA X |
| 2,966,670 | 12/1960 | Foss | 340/347 P |
| 3,369,746 | 2/1968 | Siders et al. | 235/94 R |

FOREIGN PATENTS OR APPLICATIONS

| | | | |
|---|---|---|---|
| 339,745 | 8/1959 | Switzerland | 235/61 PD |

*Primary Examiner*—Richard B. Wilkinson
*Assistant Examiner*—Stanley A. Wal
*Attorney*—Meyer Neishloss et al.

[57] ABSTRACT

A supplemental read-out for a mechanical counter comprising fingers for sensing coded patterns on the numeral wheels and for transmitting electrical signals corresponding to the sensed coded pattern to remote electronic equipment. An incremental drive is also provided at the input end of the first counter wheel to eliminate errors which might arise from the wheel stopping between two numbers.

9 Claims, 6 Drawing Figures

DIGITAL ENCODER FOR MECHANICAL COUNTERS

This application is related to U. S. Pat. No. 3,598,283, entitled "Gasoline Pump Computer", by Ronald L. Krutz and Thomas J. Villella, and also is more specifically related to the divisional application of said patent, co-pending application Ser. No. 120,647, filed Mar. 3, 1971, entitled "Pulsing Mechanism" by said Krutz and Villella, and now U.S. Pat. No. 3,686,507. This application is also related to co-pending application Ser. No. 202,266, filed on the same day as this application, entitled "Incremental Rotational Drive", by the same inventor as this application. All of the above related inventions are assigned to the same assignee as the present invention.

The first two above identified inventions constitute the environment in which the present invention was developed. In the above identified parent patent, the circuit requires a predetermined number of electrical pulses per unit volume of gasoline passing through the pump. 100 pulses per gallon was chosen in conjunction with the nature of the parent circuit because the number 100 is decimal and thus easily handled, and produces a commercially acceptable accuracy. The above identified divisional application is directed to an improved pulsing mechanism. The present invention is a conceptually different incremental drive and digital encoder particularly suited for use in place of such pulsing mechanisms.

The above identified divisional application, in summary, comprises an interlock of two electrical reed switches each operated by a separate magnet, both mounted on a single block, and arranged mechanically and electrically so that the one active pulse producing reed switch is enabled by a second reed switch and its associated magnet for only a small part of a full rotation of the mounting block. Thus the time, as a percentage of a full rotation of the mounting block, during which the system is susceptible to externally induced error, such as by spurious pulses created by the electrical systems of vehicles in the area, is reduced. However, in that system, there is still a possibility that the parts could stop in a position at which the active reed switch is susceptible to externally induced errors. The present invention improves upon that system by completely eliminating all the reed switches, and substitutes in lieu thereof code means directly mechanically associated with the ordinary number wheels on the mechanical counter.

Thus, most generally, the invention provides code means on the number wheels of a mechanical counter, and pick-up means associated with the code means. All pulsing mechanisms such as of the type identified above are eliminated.

The invention also includes means to drive a mechanical counter so that continuous or intermittently continuous rotational motion which would normally drive the counter is changed into an incremental or stepping rotational motion. That is, the motion of one shaft which rotates continuously is changed in accordance with the teaching of the invention into rotation of a second shaft which is incremental, i.e., sporadic or stepping with the angular length of each increment of motion of the second shaft corresponding to some fixed amount of rotation of the first shaft. In such means it is necessary to effectually "store" the motion of the first shaft in the apparatus of the invention until that first shaft has moved an amount corresponding, as per the ratio between the shafts, to one increment of motion of the second shaft, and to thereupon index or move the second shaft one whole increment all at once. The rotation of the first shaft may then continue, either constantly or intermittently since the storing feature of the invention accommodates either kind of motion equally well, until another incremental motion of the second shaft is required, and so forth. In the environment of the present invention, the second shaft is the normal input shaft to the least count wheel of such a counter, and the first shaft is some other shaft the rotation of which it is desired to count.

The invention was developed for and is deemed particularly suitable for use in mechanical computers such as are used in conventional gasoline dispensing pumps. The root cause of many problems devices such as the first two identified inventions above encounter may be that such apparatuses are electronic in nature and thus susceptible to interference from high voltage sources in the area of the gasoline pumps such as are normally found in automobiles. The present invention, on the other hand, eliminates this potential source of error by providing simply an electrical pick-up system between the modified counter wheels and a set of electrical contactors, and by positioning the actual computer circuitry safely away from all sources of potential interference, such as in an unused corner of a service station building, near a ceiling for example.

Another advantage of the invention is that it is highly accurate, in that the pick-ups which drive the circuitry are activated by the code means which are mechanically connected to or which may in fact be physically part of the discs, drums or counter wheels of the mechanical counter. Thus, short of a breakdown in the linkages of the mechanical computer or counter itself, circuitry driven in accordance with the invention will be virtually entirely error free.

The invention provides means to supplement the normal visual read-out of devices such as mechanical computers which have number wheels, discs, or drums with means to remotely read the value on said mechanical wheels, discs or drums, and to supply electrical signals corresponding to the reading to other electronic equipment remote from the mechanical computer. The invention also comprises two embodiments of incremental drive means positioned at the input end of the first counter wheel to thereby eliminate possible errors which might arise from the wheel stopping in a position between two numbers.

Another advantage over electrical type devices is that the invention "stores" data as a position of its parts, thus being totally oblivious for indeterminate lengths of time to any electrical power failure or eccentricity which can upset such prior circuits.

The above and other advantages of the invention will be pointed out or will become evident in the following detailed description and claims, and in the accompanying drawing also forming a part of the disclosure, in which:

Figures 1, 2:
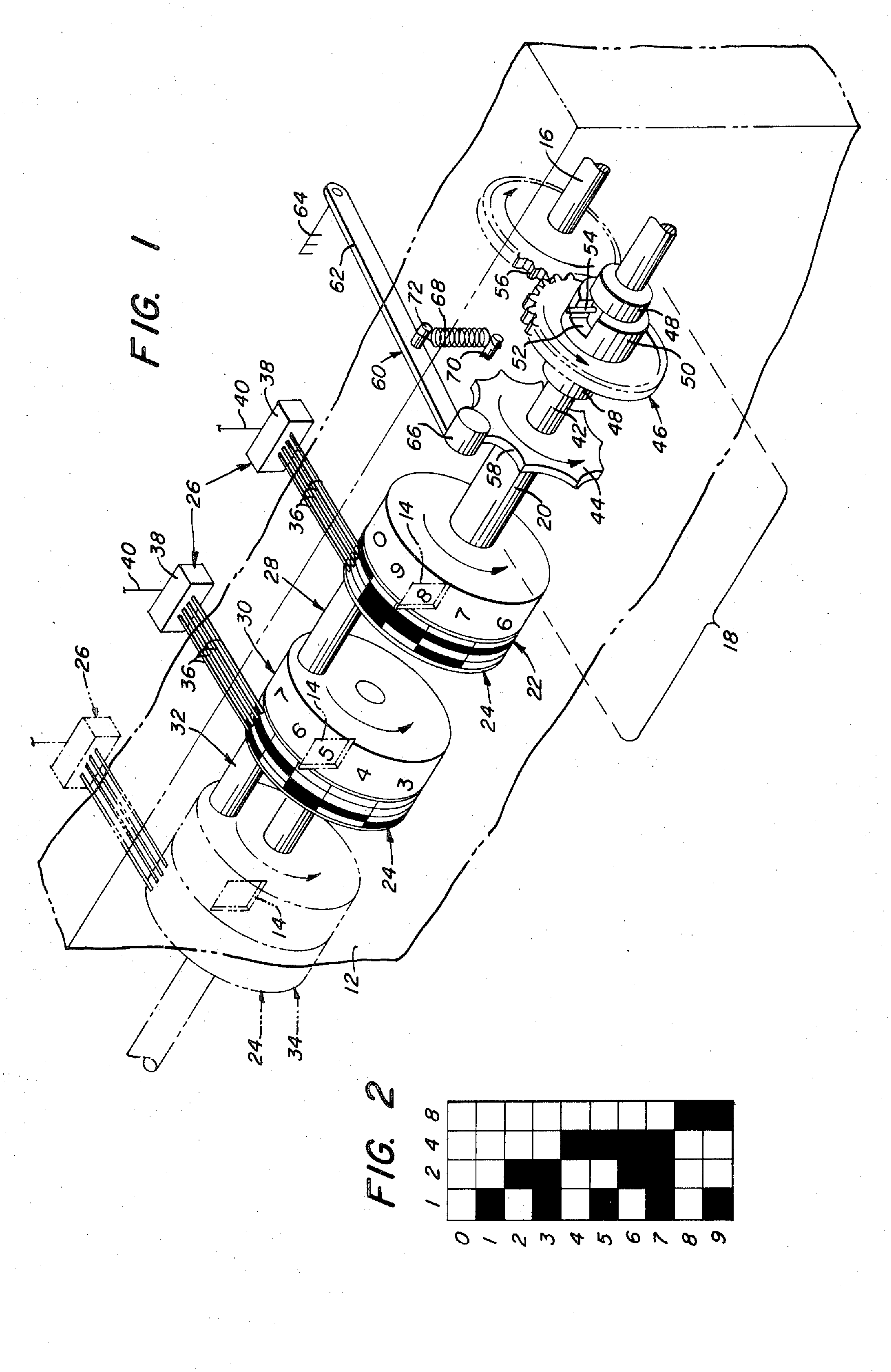
FIG. 1 is a perspective view of the invention as it might be applied to a typical mechanical computer.
FIG. 2 is a diagram of a binary code for decimal numbers which may be used in the invention.

Referring now in detail to the drawing, reference numeral 10 generally designates an apparatus embodying the invention. Apparatus 10 comprises an enclosure 12 formed with a plurality of windows 14 through which windows the normal visual read-out of the mechanical counter housed within the box 12 may be seen. The mechanical counter art is highly developed and many different types and varieties are readily available. For example see Veeder-Root Catalog No. VR-56A.

The invention is applicable for use with any sort of mechanical counter, as set forth below, regardless of the form the visual read-out members may take. That is, the invention could be used with counters having any sort of number wheels, discs, drums, or the like. Further, the numerical indicia on such read-out wheels or the like may be in any form. Thus, the expressions "wheels" and "numerical indicia" and the like shall be understood to not limit the scope of the claims to the wheels and numbers shown, but rather shall be understood to include all such mechanical means with which the invention may be used.

The invention is applicable to all such mechanical counters which operate in the conventional cascade manner. That is, the intelligence which is to drive the counter is present on a shaft 16, and this rotational motion is handled by the incremental drive portion 18 of the invention whereby shaft 16 is connected to the input shaft 20 of the counter proper. Shaft 20 drives the first wheel 22 of the counter, which wheel is normally the least count wheel. The numbers on the surface of wheel 22 are sequentially visible in the right hand most window of the enclosure 12. The surface of wheel 22, as well as the other wheels, carries code means 24 which cooperate with electric pick-up or contactor means 26 in order to remotely read the numbers on the surface of each wheel then visible in the window 14, all in a manner that will be explained in detail below.

Continuing the description of the counter, cascade means 28 interconnect the first wheel 22 with the second wheel 30, and other cascade means 32 connect the second wheel 30 to the next or third wheel 34, and the sequence can be continued in this manner as long as required within the bounds of the technology. The modus operandi is that the motion of shaft 16 drives the first wheel 22 through a full revolution, and a full turn of wheel 22 via cascade means 28 then drives the second wheel 30 one-tenth of a turn to bring up the next number in its window 14. A full revolution of the second wheel 30 produces one-tenth of a turn of the next wheel 34, etc.

A brief explanation of binary coded decimal numbers will be helpful at this point. Reference may be had to the above identified parent patent from column 6, line 51 to column 7, line 28, and the text reference mentioned therein. Briefly, however, referring to FIG. 2, the BCD code is based on the numbers 1, 2, 4 and 8 and either uses or does not use various combinations of these four numbers to represent any digital number from 0 to 9. Thus, with four conductors each of which is either on or off, any digit can be represented. It is easier for modern computing circuitry to handle four signals simultaneously which may be only on or off than 10 different signals one at a time. Referring to FIG. 2, for example, zero is represented by all signals off; 5 is represented by one on, two off, four on, and eight off; and 9 would be represented by one and eight only on. Thus FIG. 2. should now be easily understood. Referring back to FIG. 1, this BCD code has been used as the code means 24. If the reader would imagine the showing of FIG. 2 put on a piece of elastic tape and then this tape wrapped around the wheels 22, 30 or 34, then the code means 24 should be understandable. Of course, that portion of code means 24 cooperating with the pick-up means 26 at any given time must correspond to the number visible through the window 14 at that time. This is easily accomplished by simply, in the embodiment shown, displacing the code means 24 by two numbers with respect to the numbers on the wheels.

The invention is applicable to use with any other code. However, it is anticipated that the BCD code will be used because of popularity and simplicity. Since four signals are required to make up any digit in this code, each pick-up means 26 will comprise four contactor fingers 36 extending from a junction box 38 to the code means portion 24 on each wheel. A multi-conductor cable 40 leads from each box 38 to any other circuitry in which the data will be handled, such as for example, the circuitry in the above identified parent patent, suitably modified to work with BCD numbers directly rather than with pulses. The dark areas or markings in the code portions 24 in the drawing may represent grounded areas, or other means to make and break circuits via the fingers 36 in accordance with the code on the wheels. For example, the darkened areas could be grounds via internal connections to a suitable ground in or adjacent the computer and with the undarkened areas corresponding to insulated spaces. Grounding is thought to be the most practical approach. Some variations are possible, for example, a complimentary code could be used whereby 1 and 4 ungrounded would equal 5.

In the gasoline pump computer wherein it is envisioned the invention will first be used, the shaft 16 could represent the gallons shaft or the dollars shaft, among others, and the counter wheels shown would represent the display to the customer of the volume or money value of gasoline dispensed. In such a case, an extra least count wheel might be required because tenths of a cent and hundredths of a gallon can presently be read on a vernier arrangement of the present whole cent or tenth of a gallon wheel. As a practical matter, such small values could be ignored since this information is of no use to the typical customer.

In order to avoid the possibility of any wheel stopping in a position at which the ends of the fingers 36 would be resting between two numbers, the incremental drive portion 18 between the shafts 16 and 20 is provided. Portion 18 serves two purposes; it avoids the above mentioned potential problem of non-positive sensing of a number, and secondly it permits the effective storage of interim positions of shaft 16 less than that rotation sufficient to cause a motion of the least count wheel 22 from one number to the next. Reference may be had to my above identified co-pending patent application for a fuller explanation of such incremental drive means.

Incremental drive portion 18 comprises a shaft 42 to which is fixed a detent wheel 44 and on which is loosely mounted a gear 46. A pair of collars 48 prevent the gear 46 from moving lengthwise on the shaft 42. The outer end, right hand side, of shaft 42 is journaled in suitable means not shown. Gear 46 is formed with a collar portion 50 formed with a cut-out 52 in which is received a drive pin 54 attached to the shaft 42. Gear 56 is fixed to input shaft 16 and is in mesh with gear 46. The detent depressions 58 in detent wheel 44 sequentially cooperate with a spring loaded detent assembly 60 which comprises a main bar 62 pivoted as at 64 having a detent contactor 66 which is urged into contact with the depressions 58 by means of a tension spring 68 positioned between a suitable fixed anchor 70 and an anchor pin 72 on the bar 62.

Figure 3:
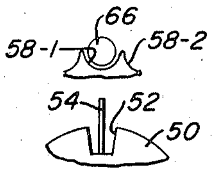
FIGS. 3, 4 and 5 are schematic sequential views illustrating the operation of part of the apparatus shown in FIG. 1.
Figure 4:
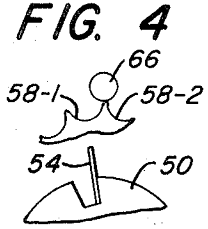
Figure 5:
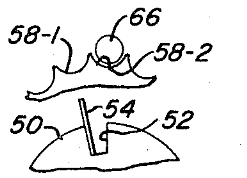

The operation of the incremental drive means 18 of FIG. 1 can be best understood with reference to the sequential views of FIGS. 3, 4 and 5. The parts bear the same reference numerals as in FIG. 1. In FIG. 3 the apparatus is in some arbitrary starting position. As shaft 16 continues to drive collar portion 50 via the meshing of gears 56 and 46, the right hand side of the cut-out 52 will come into contact with the pin 54 and will thereby make a firm driving connection between the gear 46 and the detent wheel 44 via cut-out 52 and pin 54. Continued motion of shaft 16 thereafter will, suddenly and all at once, push contactor 66 out of the first detent depression in which it was resting, arbitrarily called 58-1, into the next detent depression 58-2 as shown in FIG. 5. Since the assembly 60 is pivoted at a fixed point 64, the contactor 66 effectually moves up and down only with respect to the other parts. After the contactor 66 moves into the next depression 58-2, the shaft 42 carrying pin 54 will be, effectually, "snapped ahead", i.e., moved out of contact with the right hand side of cut-out 52 and to a closely spaced position to the left hand side thus being ready to absorb more motion of shaft 16 until such motion accumulates to the point where another least count or "snap through" or increment is required. The advantage of this structure is that any partial position of shaft 16 is "stored" in the form of an angular displacement of the loosely mounted gear 56 with respect to the pin 54, and thus such position or count will not be lost due to an electrical power failure or any other trouble of an electrical nature, or any other trouble of any kind short of a mechanical breakage of a part.

Figure 6:
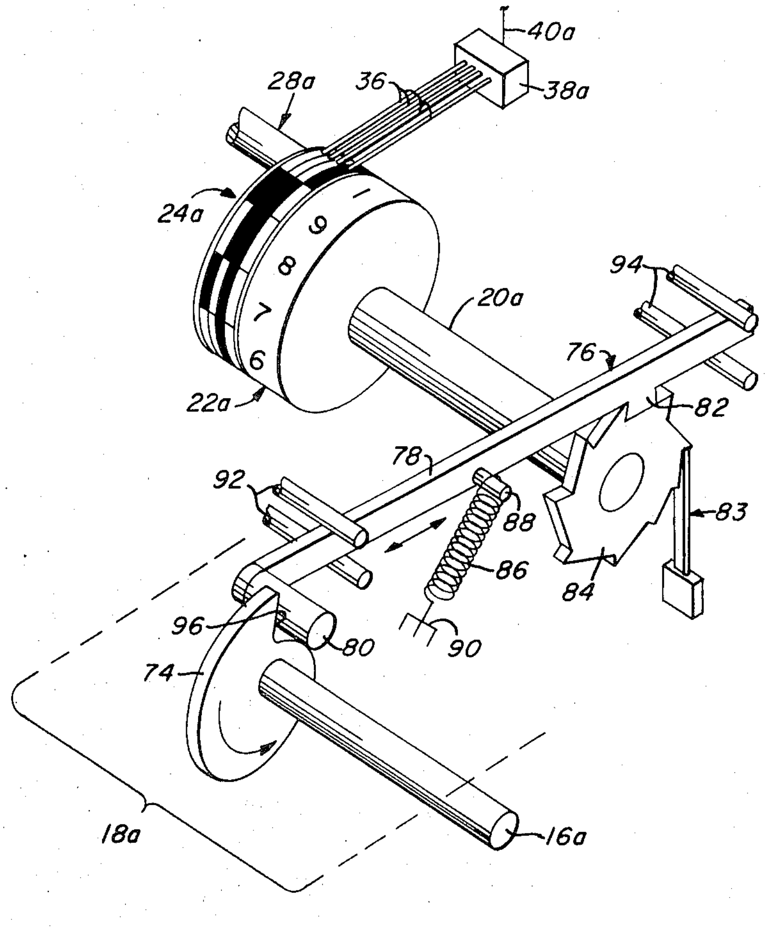
FIG. 6 is a view similar to the right hand side of FIG. 1 illustrating a modified form of the incremental drive means of the invention.

Referring now to FIG. 6, so far as possible, parts the same as or closely corresponding to those described above part are indicated by the same reference numerals followed by *a*. The second embodiment 18*a* of the incremental drive means comprises a cam 74 fixed to shaft 16*a*, which cam operates the remaining operating assembly 76. Assembly 76 comprises a main bar member 78 which is provided with a contactor portion 80 for cooperation with the cam 74 and with a rachet operating pawl portion 82 for cooperation with a rachet wheel 84 fixed to counter input shaft 20a. Means 83, which may comprise a suitably anchored flat spring type of pawl, is provided to prevent wheel 84 and shaft 23 from turning backwards. A tension spring 86 is provided between an anchor 88 on the bar 78 and some suitable fixed anchor indicated at 90. Spring 86 is disposed at a suitable angle to both bias the contactor 80 against the operating surface of the scroll-shaped cam 74 and to urge pawl portion 82 into engagement with the teeth of rachet wheel 84. A pair of closely spaced guide pins 92 act as pivots and constrain the motion of bar 78, and a second pair of guide pins 94 define the limits of motion of the pawl portion 82 towards and away from the rachet wheel 84 to prevent overshoot due to inertia. Other guide means, not shown, will be provided to constrain bar 78 to the planes containing scroll-shaped cam 74 and rachet wheel 84, as indicated in the drawing. Thus, the bar 78 may be thought of as "floating" in that it is not pivoted or provided with any other fixed type of connection. This floating bar has the advantage that it is fairly easy to work into existing devices.

It can be seen that by the provision of a suitable number of teeth on the rachet wheel 24, each such suitable number of teeth corresponding to a suitable height 96 of the scroll-shaped operating cam 74, that various different ratios between the shafts 16*a* and 20*a* can be achieved. The height 96 of the cam corresponds to the stroke of the bar 78 and thus should be equal to or greater than the length of a tooth on rachet wheel 84. This height is defined by the difference between the largest and smallest diameter of the scroll-shaped cam 74. The height 96 is "undercut" slightly, i.e., tilted slightly off radial so that the contactor 80 will not hang up but will move all at once from the largest diameter portion to the smallest diameter portion. Thus, an output of one increment of angular rotation of shaft 20*a* of any desired length can be made to correspond to one rotation of the input shaft 16*a*. Various other schemes to further increase the versatility of this second embodiment 18a of the invention will present themselves to those skilled in the art. For example, a multiple lobed operating cam 74 could be provided if other circumstances warranted the additional complication in cam manufacture.

The means to store partial rotations of the input shafts 16 or 16a is inherent in the two embodiments 18 and 18a of the incremental drive means of the invention. In both cases, any motion of the input shaft less than that motion required to move a counter wheel a full increment is stored as a position of the mechanical parts of the structure 18 or 18*a*. For example, if the least count wheel 24 or 24*a* was maintaining a running total of whole gallons dispensed, and shaft 16*a* rotated at the rate of one rotation per gallon, then any fraction of a gallon dispensed, as between sales to different customers, is inherently stored in the position of the scroll-shaped cam 74 with respect to the contactor 80. Of course, in this example, the counter in question would have to be such that it did not reset between sales. Similar logic holds for apparatus 18a with the exception that the least count wheel 22 is operated at some ratio with respect to each rotation of shaft 16 dependent upon the arcuate length of the cut-out 52. For example, if cut-out 52 was 90° in arcuate length, then one revolution at shaft 16 would operate the least count wheel 22 four times or four numbers. Thus, in the preferred embodiment of FIG. 1, the arcuate length of the cut-out 52 controls the incremental ratio in the same manner that the number of teeth on wheel 84 in combination with the number of lobes on cam 74 control the ratio in FIG. 6. Of course, as will be clear, the number of depressions 58 in the detent wheel 44 will have to correspond to the angular length of cut-out 52. That is, as shown, 10 depressions on the wheel 44, the active angular length of cut-out 52 will be approximately 36° or one-tenth of a full circle. The actual length of the cut-out 52 will be slightly larger than that to accommodate for the thickness of pin 54. In the second example given, 90° active angular length of cut-out 52, then wheel 44 would have only four depressions 58.

The incremental drive 18 or 18a will assure that the least count wheel does not stop between numbers. As to the other wheels 30, 34, et. seq. driven off of the least count wheel in cascade, many commercially available mechanical counters include means between all wheels, such as a Geneva gear, after the least count wheel, to assure an incremental type drive of such subsequent wheels.

While the invention has been described in detail above, it is to be understood that this detailed description is by way of example only, and the protection granted is to be limited only within the spirit of the invention and the scope of the following claims.

I claim:

1. In combination, a mechanical counter which is to be driven from a first shaft, incremental drive means between said first shaft and the input shaft to the least count wheel of said counter; said incremental drive means comprising a gear mounted on said first shaft, a second gear loosely mounted on said input shaft, said input shaft gear comprising a collar portion formed with a cut-out having a predetermined angular length, a drive pin attached to said input shaft and extending into said cut-out, and detent means on said input shaft; code means directly associated with the numerical indicia on each of the wheels of said mechanical counter, and pick-up means associated with each of said code means.

2. The combination of claim 1, said detent means being formed with a number of depressions proportional to the angular length of said cut-out.

3. The combination of claim 1, said detent means comprising a detent wheel fixed to said input shaft, and a spring loaded detent assembly having a contactor portion which is resiliently urged into each depression in said detent wheel sequentially.

4. The combination of claim 1, said code means comprising markings in accordance with the BCD code on each of said counter wheels, and being so positioned on each of said counter wheels with respect to the normal visually perceptible numerical indicia thereon and with respect to said pick-up means that the number picked up from said code means by said pick-up means is the same as the number then normally visible to a user.

5. The combination of claim 4, said pick-up means comprising four fingers each cooperable with a separate track in the direction of motion of said counter wheels, whereby the combination of active or inactive ones of said four fingers represents the number then normally visible to a user in the BCD code.

6. The combination of claim 4, said markings comprising electrical ground means, and said pick-up means comprising four fingers each cooperable with a separate track in the direction of motion of said counter wheels, whereby the combination of grounded or not grounded ones of said four fingers represents the number then normally visible to a user in the BCD code.

7. The combination of claim 1, wherein said counter is part of the mechanical computer in a retail gasoline dispensing pump, whereby the volume of or money value of gasoline dispensed may be read remotely from said pump.

8. In combination, a mechanical counter which is to be driven from a first shaft, incremental drive means between said first shaft and the input shaft to the least count wheel of said counter; said incremental drive means comprising cam means mounted on said first shaft, lever means operated by said cam means, a rachet wheel operated by said lever means, and spring means for urging said lever means into contact with both said cam means and said rachet wheel; said lever means comprising a floating bar having a pawl portion cooperable with said rachet wheel and constrained to motion between said cam means and said rachet wheel by said spring means and a plurality of guide pins; code means directly associated with the numerical indicia on each of the wheels of said mechanical counter, and pick-up means associated with each of said code means.

9. The combination of claim 2, wherein said cam means comprises a scroll-shaped operating surface for cooperation with said lever means having a height between its smallest diameter portion and its largest diameter portion substantially equal to the length of a flat of a tooth on said rachet wheel, and wherein said height is undercut slightly to facilitate the motion of said lever means from said largest diameter portion to said smallest diameter portion.

* * * * *